(12) United States Patent
Mosquera et al.

(10) Patent No.: US 11,030,071 B2
(45) Date of Patent: Jun. 8, 2021

(54) CONTINUOUS SOFTWARE DEPLOYMENT

(71) Applicant: Armory, Inc., San Mateo, CA (US)

(72) Inventors: Isaac Mosquera, San Mateo, CA (US);
Ben Mappen, San Francisco, CA (US);
Andrew Backes, San Mateo, CA (US);
Alex Bello, San Francisco, CA (US);
Daniel R. Odio, San Mateo, CA (US)

(73) Assignee: Armory, Inc., San Mateo, CA (US)

( * ) Notice: Subject to any disclaimer, the term of this patent is extended or adjusted under 35 U.S.C. 154(b) by 69 days.

(21) Appl. No.: 16/385,534

(22) Filed: Apr. 16, 2019

(65) Prior Publication Data

US 2019/0317754 A1 Oct. 17, 2019

Related U.S. Application Data

(60) Provisional application No. 62/657,933, filed on Apr. 16, 2018.

(51) Int. Cl.

| | | |
|---|---|---|
| *G06F 9/44* | (2018.01) | |
| *G06F 11/34* | (2006.01) | |
| *G06F 8/65* | (2018.01) | |
| *G06F 8/77* | (2018.01) | |
| *G06F 8/71* | (2018.01) | |
| *H04L 12/24* | (2006.01) | |
| *G06Q 10/06* | (2012.01) | |
| *H04L 12/58* | (2006.01) | |
| *H04L 12/26* | (2006.01) | |
| *G06F 11/30* | (2006.01) | |

(52) U.S. Cl.
CPC ............ *G06F 11/3409* (2013.01); *G06F 8/65* (2013.01); *G06F 8/71* (2013.01); *G06F 8/77* (2013.01); *G06F 11/302* (2013.01); *G06F 11/3419* (2013.01); *G06Q 10/06316* (2013.01); *H04L 41/5003* (2013.01); *H04L 43/08* (2013.01); *H04L 51/02* (2013.01)

(58) Field of Classification Search
CPC . G06F 8/71; G06F 3/0659; G06F 8/65; G06F 11/302; G06F 11/3409; G06N 20/00; G06Q 40/10; G06Q 10/06316; H04L 67/306; H04L 43/04; H04L 47/76; H04L 41/5096; H04L 41/5005; H04L 51/02; H04L 43/08
See application file for complete search history.

(56) References Cited

U.S. PATENT DOCUMENTS

| | | | | |
|---|---|---|---|---|
| 9,306,814 | B1 * | 4/2016 | Roth | ........................ H04L 47/76 |
| 9,710,859 | B1 * | 7/2017 | Theimer | ................ G06Q 40/10 |
| 10,380,498 | B1 * | 8/2019 | Chaoji | .................... G06N 20/00 |
| 10,735,538 | B2 * | 8/2020 | Gu | ......................... G06F 3/0659 |
| 2014/0379901 | A1 * | 12/2014 | Tseitlin | ............... H04L 41/5096 |
| | | | | 709/224 |
| 2015/0256483 | A1 * | 9/2015 | Bragstad | ................. H04L 43/04 |
| | | | | 709/219 |

(Continued)

*Primary Examiner* — Tuan A Vu
(74) *Attorney, Agent, or Firm* — Cognition IP, P.C.; Edward Steakley

(57) ABSTRACT

Methods and systems may be used to deploy software more quickly from development to a production environment. The methods and systems may speed up the process of developing and deploying new code. Integrations may be provided to monitor aspects of the system to provide statistics and metrics for better understanding and to automatically optimize certain aspects of the software development cycle.

13 Claims, 14 Drawing Sheets

(56) References Cited

U.S. PATENT DOCUMENTS

2017/0046146 A1\* 2/2017 Jamjoom .................. G06F 8/71
2018/0253985 A1\* 9/2018 Aggarwal ............. H04L 67/306
2019/0102386 A1\* 4/2019 Bell .................... H04L 41/5006

\* cited by examiner

CONTINUOUS SOFTWARE DEPLOYMENT

CROSS-REFERENCE TO RELATED APPLICATIONS

This application claims the benefit of U.S. Provisional Patent Application No. 62/657,933, filed Apr. 16, 2018, which is hereby incorporated by reference in its entirety.

FIELD OF THE INVENTION

The present disclosure relates to methods and systems for deploying software more quickly and efficiently.

BACKGROUND

Current software development teams deploy software from their development environment, the system of computers where they develop code, to production environments, the system of computers that provides services to customers, in an inefficient manner. New code developed by developers goes through a manual review process by management, which is slow and results in inconsistent human judgments. Moreover, software is deployed on existing hardware infrastructure. This can cause misconfigurations as the hardware infrastructure is updated. Also, the performance of the newly updated version must be manually compared with the performance of the prior version to determine if the new version meets performance guidelines or not. Also, because the new version of the software is deployed on the same hardware infrastructure and replaces the old version of the software, it is not possible to rollback to the pre-existing production version if the new update has errors.

There is a need for automated systems to replace the systems of human judgment in deploying code. It would be advantageous for code to be deployed automatically after it is developed through use of automatic algorithms, rules, and intelligent systems for determining when code should be deployed or rolled back. Moreover, integrations with analytics and software development may be used to provide additional metrics and statistics to human operators about the performance and value added by each deployment.

SUMMARY

Aspects of some embodiments relate to deploying software more quickly than with traditional methods.

One embodiment relates to a method of automated canary deployment. A first production hardware infrastructure may be provided running a first production code. A code update may be received in a development environment. A second production hardware infrastructure may be launched to run a second production code that incorporates the code update. A first portion of user traffic may be directed to the first production hardware infrastructure and a second portion of user traffic may be directed to the second production hardware infrastructure. The performance of the first production code and the second production code may be monitored. It may be determined whether the performance of the second production code falls below a threshold performance on one or more metrics. If the second production code does not fall below the threshold performance on the one or more metrics for a period of time, the first portion of user traffic may be redirected from the first production hardware infrastructure to the second production hardware infrastructure.

One embodiment relates to a method for creating a software application that provides a software service. The method may include receiving a user input indicative of a desire to create a new application. A user selection of a coding language may be received. A user input indicative of an application name may be received. Without further user input, a computer system may perform the remaining steps to create the software application. For example: a repository for storing code for the new application may be created; continuous integration may be configured and enabled for the repository to be continuously updated with code from a plurality of developers; a continuous deployment pipeline may be created for deploying code from the repository to a production release; a user entity with permissions for managing production hardware infrastructure may be created; tokens may be created for secrets management; a dashboard may be created for displaying application performance metrics from the production release; application alerts may be created and assigned to one or more teams selected from a plurality of teams; an application framework may be initiated corresponding to the coding language; and health checks may be initiated for the production hardware infrastructure.

One embodiment relates to a method for automatically determining a service level agreement (SLA) for a software application. A software application may be provided. An application performance monitoring platform may monitor the performance of the software application and determine application performance statistics. A user configuration may be received of a method for computing a service level agreement based on the application performance characteristics. The service level agreement of the software application may be computed according to the user configured method for computing the service level agreement.

One embodiment relates to a method and system for providing continuous deployment pipeline templates. Computer storage may include computer code comprising a continuous deployment pipeline template. A repository may store said computer code. The continuous deployment pipeline template may comprise a sequence of stages that define a continuous deployment pipeline, at least one of the stages may be deployment of infrastructure or disabling of infrastructure.

One embodiment relates to providing integrations for tools at multiple stages of the software development life cycle (SDLC) including business story, writing code, testing, deployment, and troubleshooting. Integrations may collect data and provide more insight about the overall software development life cycle. Moreover, machine intelligence may be used to suggest actions to take at different stages of the software development life cycle.

One embodiment relates to providing analytics related to mean time to resolution. A software integration may be provided that identifies a first time when an issue is identified in a software application. The software integration may identify a second time when the issue is resolved. A mean time to resolution for issues may be calculated.

One embodiment relates to providing analytics related to lead time. A software integration may be provided that identifies a first time when a developer begins coding a new feature. The software integration may identify a second time when the new feature is released in a production release. A lead time may be calculated by measuring the time between when development was initiated on the new feature and when the new feature was released.

DETAILED DESCRIPTION

Figure 1:
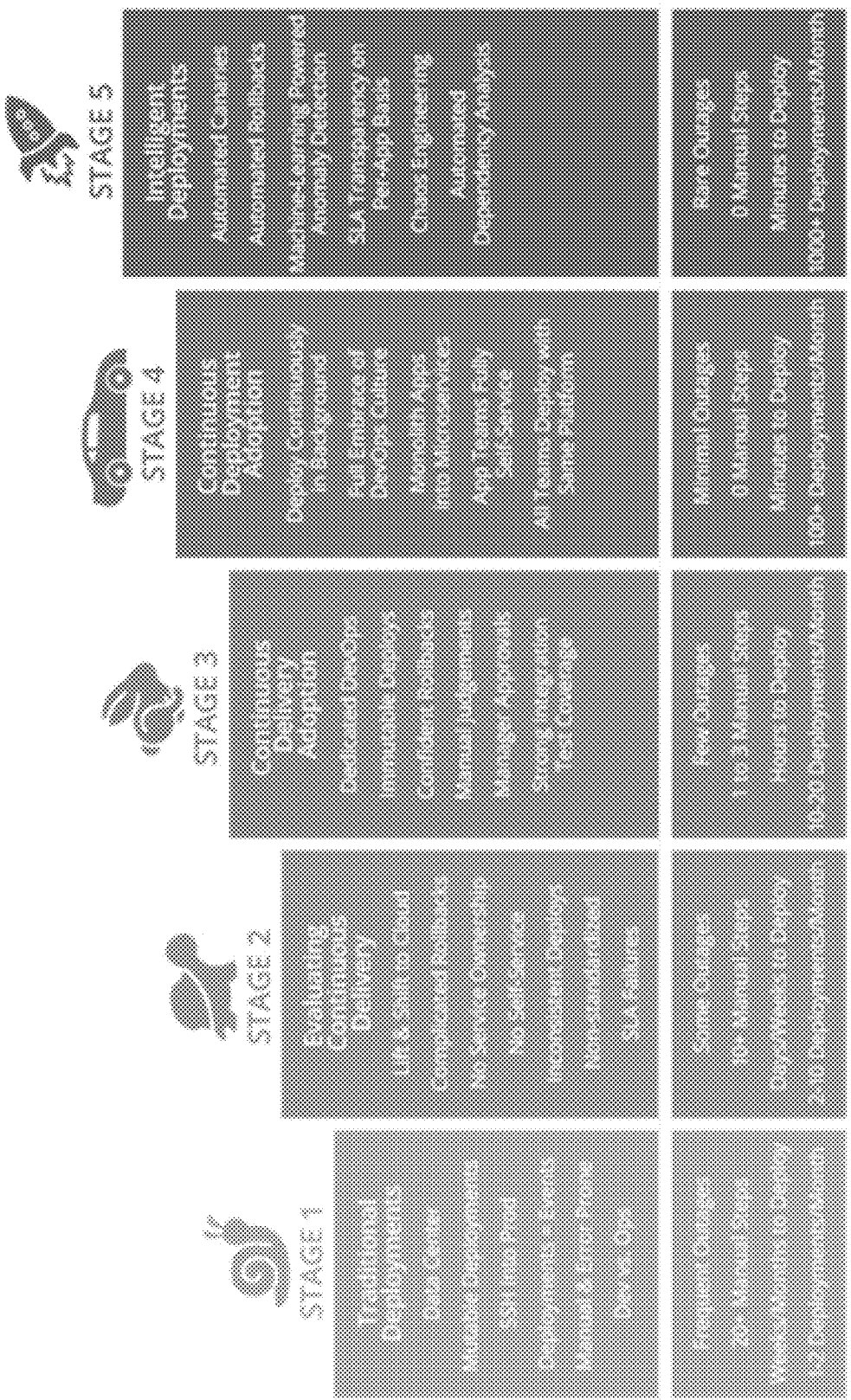
FIG. 1 illustrates a five stage categorization of software delivery evolution.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Embodiments of the invention may comprise one or more computers. Embodiments of the invention may comprise software and/or hardware. Some embodiments of the invention may be software only and may reside on hardware. A computer may be special-purpose or general purpose. A computer or computer system includes without limitation electronic devices performing computations on a processor or CPU, personal computers, desktop computers, laptop computers, mobile devices, cellular phones, smart phones, PDAs, pagers, multi-processor-based devices, microprocessor-based devices, programmable consumer electronics, cloud computers, tablets, minicomputers, mainframe computers, server computers, microcontroller-based devices, DSP-based devices, embedded computers, wearable computers, electronic glasses, computerized watches, and the like. A computer or computer system further includes distributed systems, which are systems of multiple computers (of any of the aforementioned kinds) that interact with each other, possibly over a network. Distributed systems may include clusters, grids, shared memory systems, message passing systems, and so forth. Thus, embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. A computer-readable media is physical media that can be accessed by a computer. It may be non-transitory. Examples of computer-readable media include, but are not limited to, RAM, ROM, hard disks, flash memory, DVDs, CDs, magnetic tape, and floppy disks.

Computer-executable instructions comprise, for example, instructions which cause a computer to perform a function or group of functions. Some instructions may include data. Computer executable instructions may be binaries, object code, intermediate format instructions such as assembly language, source code, byte code, scripts, and the like. Instructions may be stored in memory, where they may be accessed by a processor. A computer program is software that comprises multiple computer executable instructions.

A database is a collection of data and/or computer hardware used to store a collection of data. It includes databases, networks of databases, and other kinds of file storage, such as file systems. No particular kind of database must be used. The term database encompasses many kinds of databases such as hierarchical databases, relational databases, post-relational databases, object databases, graph databases, flat files, spreadsheets, tables, trees, and any other kind of database, collection of data, or storage for a collection of data.

A network comprises one or more data links that enable the transport of electronic data. Networks can connect computer systems. The term network includes local area network (LAN), wide area network (WAN), telephone networks, wireless networks, intranets, the Internet, and combinations of networks.

In this patent, the term "transmit" includes indirect as well as direct transmission. A computer X may transmit a message to computer Y through a network pathway including computer Z. Similarly, the term "send" includes indirect as well as direct sending. A computer X may send a message to computer Y through a network pathway including computer Z. Furthermore, the term "receive" includes receiving indirectly (e.g., through another party) as well as directly. A computer X may receive a message from computer Y through a network pathway including computer Z.

Similarly, the terms "connected to" and "coupled to" include indirect connection and indirect coupling in addition to direct connection and direct coupling. These terms include connection or coupling through a network pathway where the network pathway includes multiple elements.

To perform an action "based on" certain data or to make a decision "based on" certain data does not preclude that the action or decision may also be based on additional data as well. For example, a computer performs an action or makes a decision "based on" X, when the computer takes into account X in its action or decision, but the action or decision can also be based on Y.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer includes one or more computers. The term computer system includes one or more computer systems. The term computer server includes one or more computer servers. The term computer-readable medium includes one or more computer-readable media. The term database includes one or more databases.

FIG. 1 illustrates a five stage categorization of software delivery evolution developed by the inventors, with the later stages 3 through 5 enabled by the technology described in this patent. The lower numbered stages are less evolved and less efficient, while the higher numbered stages are more evolved and more efficient. Deployment practices in enterprises and other organizations can be categorized into one of the five stages, though it should be understood that the stages are not entirely discrete or mutually exclusive. Organizations may perform aspects in different stages, rather than all in the same stage.

Stage 1 organizations use traditional deployments and host their production environments in a data center. They deploy software on to existing infrastructure by overwriting and destroying previous production versions of code. This is known as a mutable deployment because existing infrastructure is mutated, in other words changed. The deployment process requires many manual steps and there are usually frequent outages.

Stage 2 organizations are in the process of evaluating continuous delivery. They host their production environments in the cloud rather than a data center. However, they still use non-standardized and inconsistent deployment practices. They deploy on existing cloud infrastructure with mutable deployments that destroy prior production versions. The deployment process still requires many manual steps and there are some outages.

Stages 3 through 5 are new improvements over stages 1 and 2 that are implemented and enabled using the new techniques described herein in this patent.

Stage 3 is continuous delivery adoption. In stage 3, production environments are hosted in the cloud and use immutable deployments. Immutable deployments are the deployment of new versions of production code on new hardware infrastructure. New hardware infrastructure is launched concurrently with the launch of new software, and the new software installed and deployed on the new hardware infrastructure. This avoids configuration problems that may occur when software is repeatedly overwritten or uninstalled and reinstalled. Moreover, the newly deployed software can exist side-by-side with the pre-existing production code meaning that user traffic can be directed to both production deployments. If the new deployment fails to meet performance metrics, traffic can be redirected to the pre-existing deployment and the new deployment deleted. This allows rolling back a new deployment to prior production versions. However, even stage 3 may have 1-3 manual steps involved in deployment, and it may take hours to deploy code to production.

Stage 4 is continuous deployment adoption. This includes the same best practices as stage 3, including the use of immutable deployments in the cloud, but also includes the ability to deploy code with no manual steps. Code that is checked into a repository can be deployed continuously in the background. Performance testing can be performed automatically to determine when deployments should be fully adopted in production or rolled back. Deployments can be performed in minutes, and hundreds of deployments can be performed per month.

Stage 5 is intelligent deployments. This includes the same best practices as stage 4 but also uses automated canaries and automated rollbacks such as those described herein. Moreover, machine learning may be used to detect anomalies. In stage 5, thousands of deployments can be performed per month.

Figure 2:
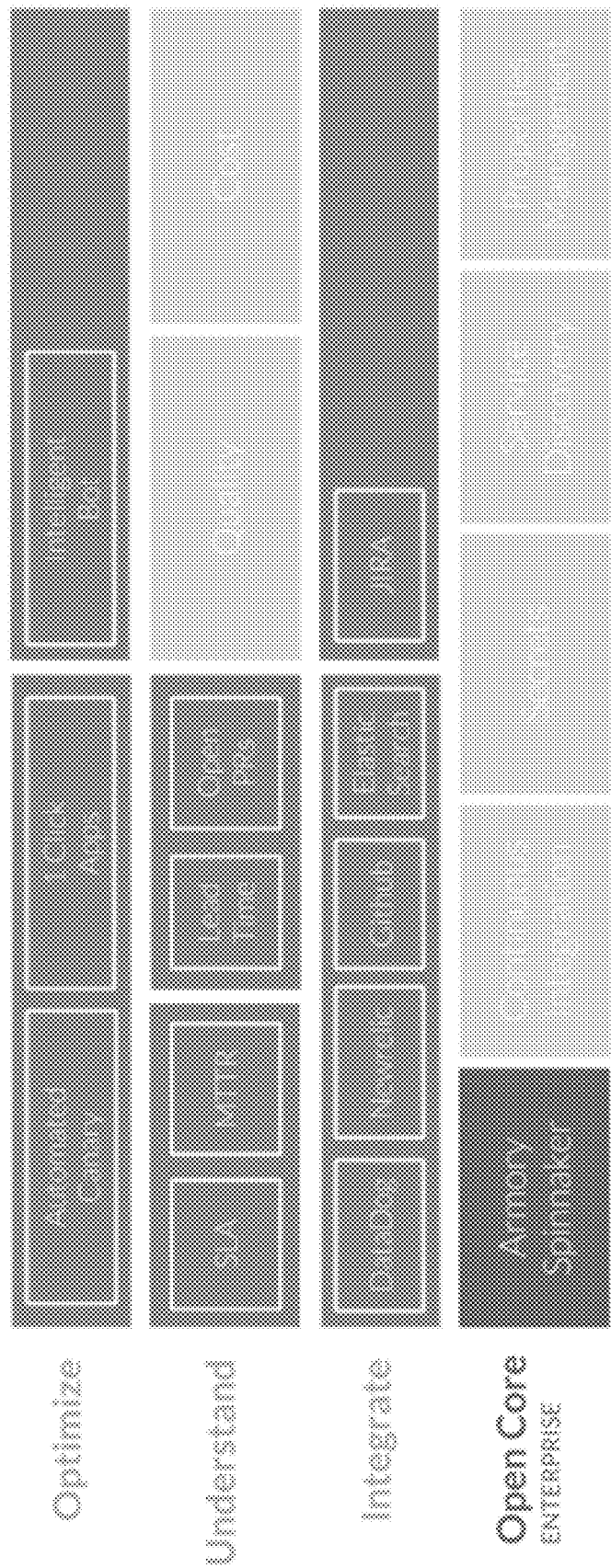
FIG. 2 illustrates several technologies that enable continuous and intelligent delivery of software.

FIG. 2 illustrates several technologies that enable stages 3 through 5 of software delivery evolution. In one embodiment, the technologies are integrated in a single continuous deployment platform known as Armory. However, it should be understood that other contemplated embodiments would include the technologies being disparate components of different platforms or used individually. Not all components need be used in embodiments of the invention.

The diagram illustrates four layers of a continuous deployment platform, namely a core layer, integrate layer, understand layer, and optimize layer.

At the core layer, a core platform may be provided. The core platform may provide functionality for launching immutable deployments and also rolling back deployments that were released on immutable infrastructure. The integrate layer includes integrations with other tools to collect data or provide additional value. Application Performance Management software, such as but not limited to DataDog and Newrelic, may allow monitoring of performance data that enables higher level functions of the continuous deployment platform. A repository, such as but not limited to Github. may be used for code commits and versioning of the code base. A search and analytics platform for analyzing server logs, such as but not limited to Elastic Search, may also be provided. An issue tracking and project management platform for tracking issues and managing software projects, such as but not limited JIRA, may also be provided. Each of these tools may be integrated to share data with the overall continuous deployment platform.

An understand layer may provide analytics and data from the continuous delivery platform. It may track compliance with service level agreements (SLAs), which define the guaranteed level of service of an application, commonly based on uptime, response time, latency, error rate, and other metrics. Mean time to resolution (MTTR) is the mean time to resolve issues in an application. Lead time is the time from the start of a developer coding on an application to the time when it is in production and users are receiving value from the code. Open pull requests (PRs) are code pushed by a developer that has not been merged into the code repository and released in production code. Having many open pull requests is an indication that an organization has many new features created by their developers that are undeployed and not driving value for the organization.

The optimize layer may provide features to optimize the deployment process. Automated canaries may provide for automated canary deployments that test newly deployed code on a subset of users before redirecting all production traffic to the new deployment. One click application creation may allow developers to create new applications with the single click of a button, instead of requiring many steps to initialize. An intelligent bot may allow developers to access and use aspects of the continuous deployment platform from within a chat interface.

In some embodiments, a method for automated canary deployment may be provided. Canary deployments allow developers to release new code in an immutable deployment (on new infrastructure) and direct a small portion of user traffic to the new deployment. The existing production release may continue to receive the majority of user traffic in parallel. Application performance monitoring is performed to analyze the performance of the new deployment to determine its performance characteristics. If the performance characteristics are good, then all of the user traffic may directed to the new deployment and the existing production release may be disabled. However, if the performance characteristics are bad, then the new deployment may be rolled back. The rollback is performed by directing the traffic away from the new deployment and back to the existing production release. The infrastructure hosting the new deployment may then be disabled. This method gives "canary deployment" its name because directing a small portion of user traffic to the new deployment allows performance analysis to determine whether the new deployment has issues or not and thus acts like a canary in a coal mine.

Figure 3:
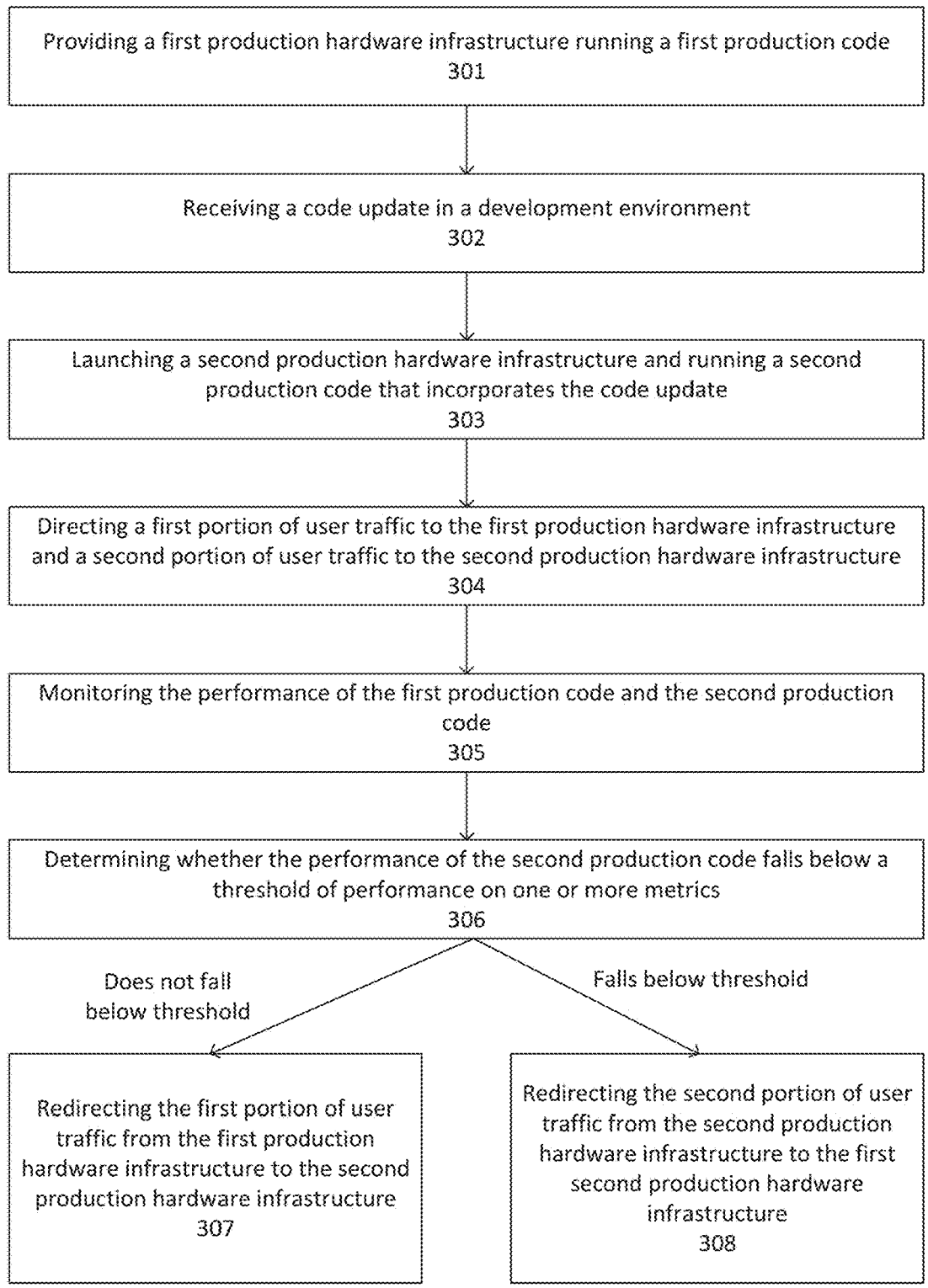
FIG. 3 illustrates an exemplary method for automated canary deployment.

FIG. 3 illustrates an exemplary method 300 for automated canary deployment. In step 301, a first production hardware infrastructure running a first production code is provided. In some embodiments, all or substantially all user traffic may be directed to the first production hardware infrastructure, such as when the first production hardware infrastructure is the current production release. In other embodiments, the first production hardware infrastructure may be a control group created specifically for comparison to a new deployment. In step 302, a code update is received in a development environment. For example, the code update may be a code commit from a developer and request to merge into a production branch of code in a repository. The code update may be merged into existing production code in the repository. In step 303, a second production hardware infrastructure may be launched and may run a second production code that incorporates the code update. In this way, the new code committed by the developer may be incorporated and launched into a production release so that the new features are provided in production services. In step 304, a first portion of user traffic may be directed to the first production hardware infrastructure and a second portion of user traffic may be directed to the second production hardware infrastructure.

It should be understood that production hardware infrastructure may be virtual and exist in the cloud. The virtual infrastructure may be spun up or down on demand. Moreover, some virtual hardware infrastructure may comprise only a portion of a physical hardware machine. Also, production hardware infrastructure may be groups of servers, not just one server. For example, production hardware infrastructure may comprise a pool of available servers. In some embodiments, the production hardware infrastructure is a pool of available servers that automatically scales up and down on demand. A load balancer may placed in front of the pool of servers and distribute requests to the servers. At times of high user demand, when there are many user requests, additional servers may be automatically added to the pool of servers. When demand is lower and there are few user requests, some of the servers may be removed from the pool and disabled.

In step 305, the performance of the first production code and the second production code may be monitored. In some embodiments, the performance monitoring of the first production code and the second production code includes monitoring one or more of the uptime, response time, latency, and error rate.

In step 306, it may be determined whether the performance of the second production code falls below a threshold of performance on one or more metrics. In some embodiments, the second production code is monitored for adverse events, such as events in a server log. An analytics platform may be used to search server logs to return the number of lines where an adverse event is found. A threshold number of acceptable adverse events may be provided through user configuration, where in some embodiments the threshold is zero, one, or more. The threshold number of acceptable adverse events may be provided as an absolute number or a number relative to the first production code, which operates as a control. For example, the threshold number of acceptable events may be specified as an acceptable percentage of deviation from the number of adverse events of the first production code. If the threshold number of adverse events is exceeded, then this may be considered a failure condition where the performance of the second production code has fallen below the threshold of performance. Aside from adverse events, the second production code is also monitored for metrics such as uptime, response time, latency, error rate, CPU usage, queue size, and other metrics. User configurable parameters may be provided of acceptable uptime, response time, latency, error rate, CPU usage, queue size, and other metrics. If the measured performance metrics of the second production code falls outside the thresholds set by the user configurable parameters, then this may also be considered a failure condition where the performance of the second production code has fallen below the threshold of performance. The user configurable parameters may be absolute or may be relative to the first production code. For example, the user configurable parameters may be specified as number of acceptable standard deviations from the performance metrics of the concurrently running first production code.

In step 307, if the second production code does not fall below the threshold performance on the one or more metrics for a given period of time, the first portion of user traffic may be redirected from the first production hardware infrastructure to the second production hardware infrastructure. In addition, the first production hardware infrastructure may be disabled. On the other hand, in step 308, if the second production code does fall below the threshold performance on one or more metrics, then the second portion of user traffic may be redirected from the second production hardware infrastructure to the first production hardware infrastructure and the second production hardware infrastructure may be disabled.

Figure 4:
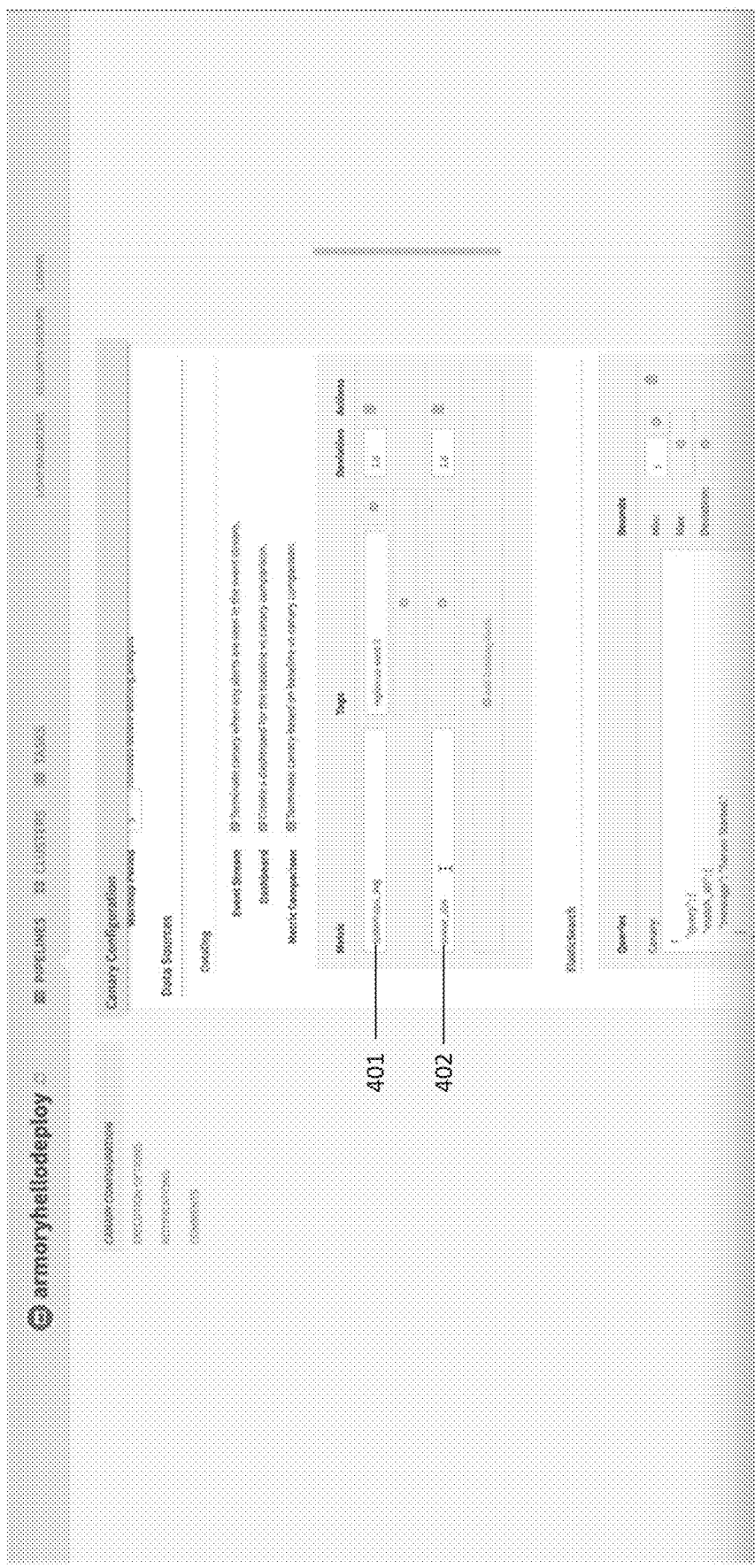
FIG. 4 shows an exemplary user interface screen for configurating an automated canary deployment.

FIG. 4 shows an exemplary user interface screen for configuring an automated canary deployment. The user interface screen shows fields for configuring the data sources for evaluating the canary and also the relevant performance metrics, which in this case are the system average CPU usage 401 and the queue size 402. Moreover, it allows setting the acceptable performance threshold of the canary, which in this case is shown as an acceptable deviation from the control group.

In some embodiments, an improved and automated method of application creation may be provided. Historically, developers must perform many manual steps to create a new application. It would be desirable to automatically connect these steps together to be performed in sequence so that manual configuration is minimized, or even not required at all. In some embodiments, application creation may be performed with one click.

Figure 5A:
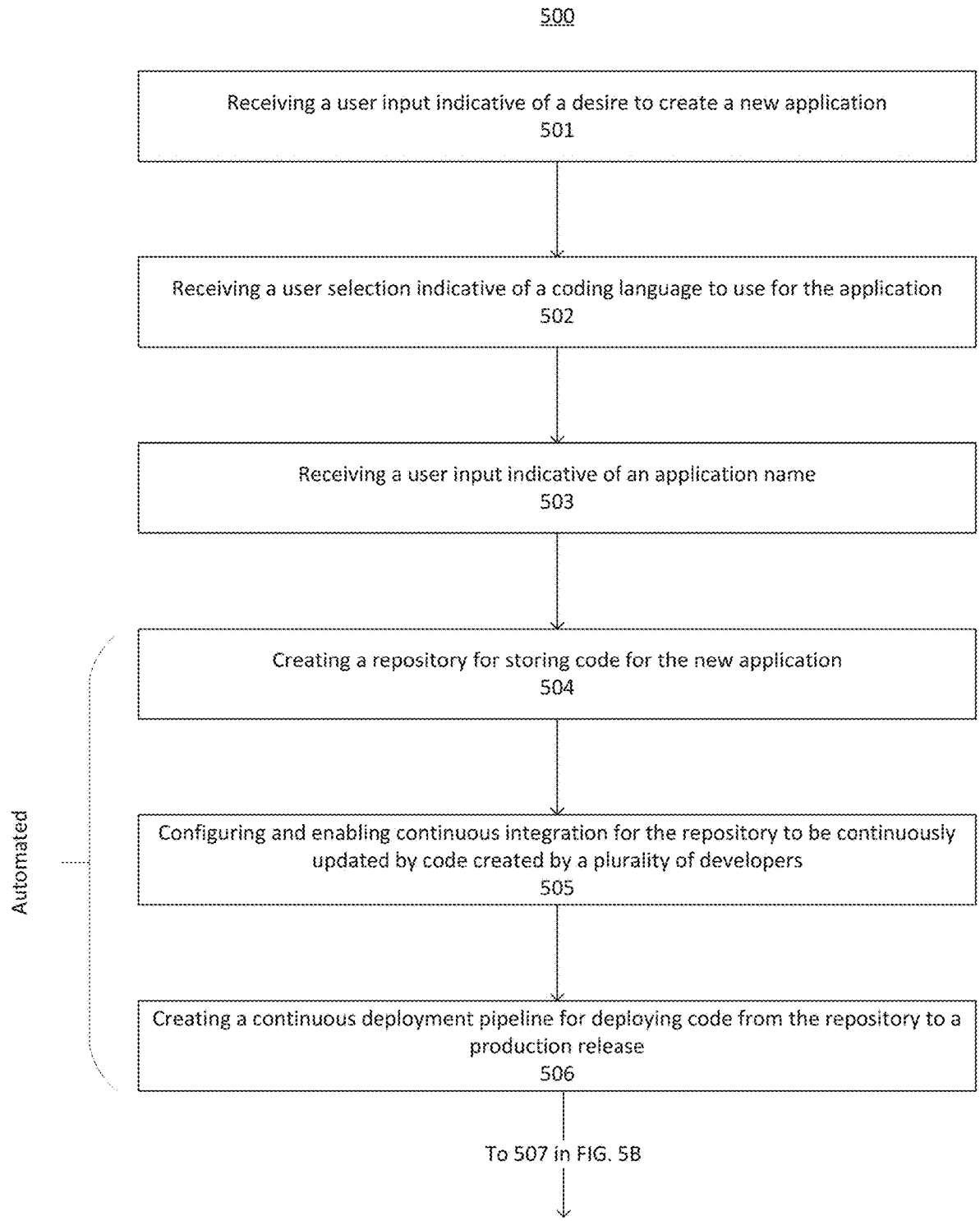
FIGS. 5A-B illustrates an exemplary method for application creation.
Figure 5B:
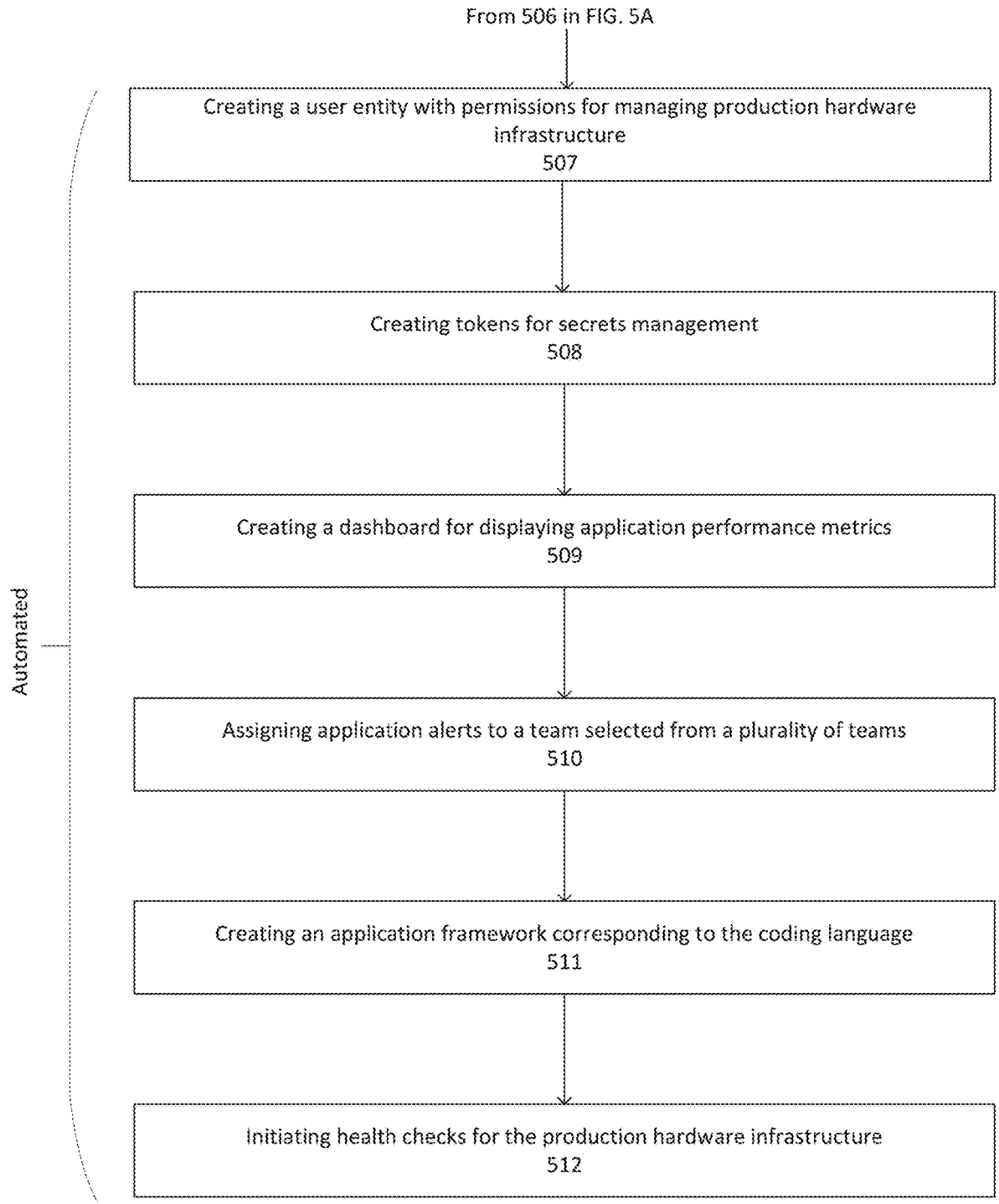

FIGS. 5A-B illustrate an exemplary method 500 for application creation. In step 501, a user input indicative of a desire to create a new application is received. In step 502, a user selection indicative of a coding language to use for the application is received. In step 503, a user input indicative of an application name is received. Optionally, an additional user input indicative of confirmation to create an application may be received.

Without further user input, the system may perform one or more steps to automatically create an application, including a development environment and configuration for continuous deployment to a production environment. In step 504, a repository is created for storing code for the new application. In step 505, continuous integration is configured and enabled for the repository to be continuously updated with code created by a plurality of developers. The continuous integration process typically occurs after a pull request has been submitted, reviewed and approved by a code reviewer, and then merged. After the merge, continuous integration performs automated build and testing of the code to ensure that new code is properly integrated without errors. In step 506, a continuous deployment pipeline is created for deploying code from the repository to a production release. The continuous deployment pipeline may include automated canary deployment as in method 300. In step 507, a user entity is created with permissions for managing production hardware infrastructure. The user entity may be given permissions to create and disable production hardware infrastructure. In step 508, tokens may be created for secrets management. In step 509, a dashboard may be created for displaying application performance metrics of the production release. In step 510, application alerts from the production release may be assigned to a team selected from a plurality of teams. The selected team receives alerts when issues arise in the production release. The alerts may be sent by the system via email, text message, phone call, or other methods of communication. In step 511, an application framework corresponding to the coding language is created and initiated. In step 512, health checks are initiated for the production hardware infrastructure. A health check server system automatically accesses the production hardware infrastructure to ensure that the production hardware infrastructure sends a correct response. If a correct response is not received, the health check fails. If a correct response is received, the health check is passed. The health checks are performed at periodic intervals.

Through method 500, an entire application framework may be created for development of the application by the developer, a repository may be provided for storing code, and continuous deployment pipeline may be created to allow for automatic deployment into a production environment. The automatic creation and management of the user entity and the secrets management allows for automatic launching and disabling of infrastructure.

Figure 6:
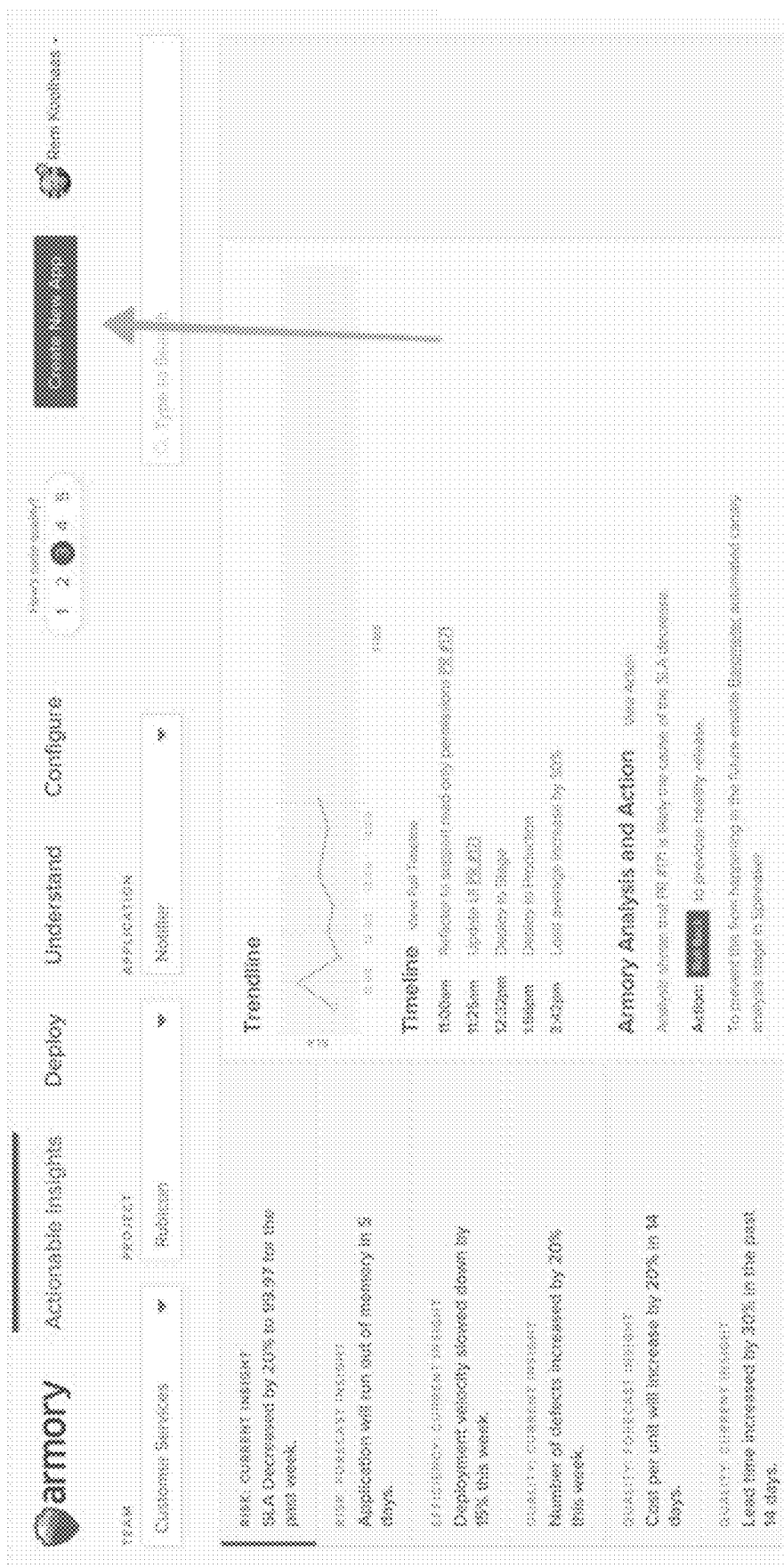
FIG. 6 shows a first exemplary interface screen for creating an application.
Figure 7:
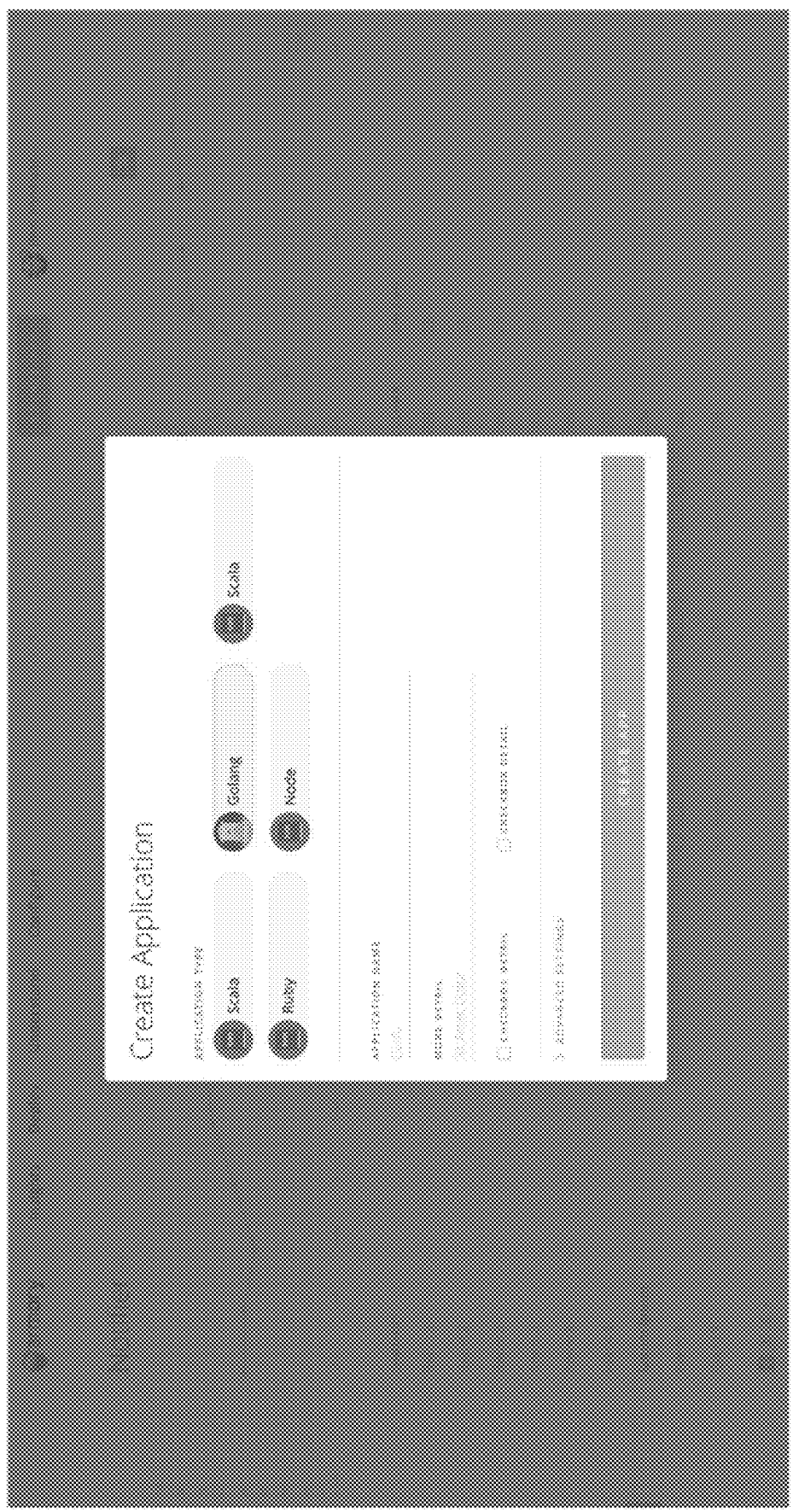
FIG. 7 shows a second exemplary interface screen for creating an application.

FIG. 6 illustrates an exemplary interface with a "Create New App" button that allows creation of a new application with a single click, such as using the method 500. FIG. 7 shows an exemplary interface screen that is displayed after clicking the "Create New App" button. The interface allows selection of an application type based on coding language. It also allows entry of an application name, additional detail, and advanced settings. A "Create App" button allows confirmation by the user of the desire to create a new application.

In some embodiments, a method for automatically determining a service level agreement is provided. Service level agreements specify the service guarantees provided by an application and may include components guaranteeing performance meeting certain thresholds such as certain levels of uptime, response time, latency, error rate, and other performance metrics.

Figure 8:
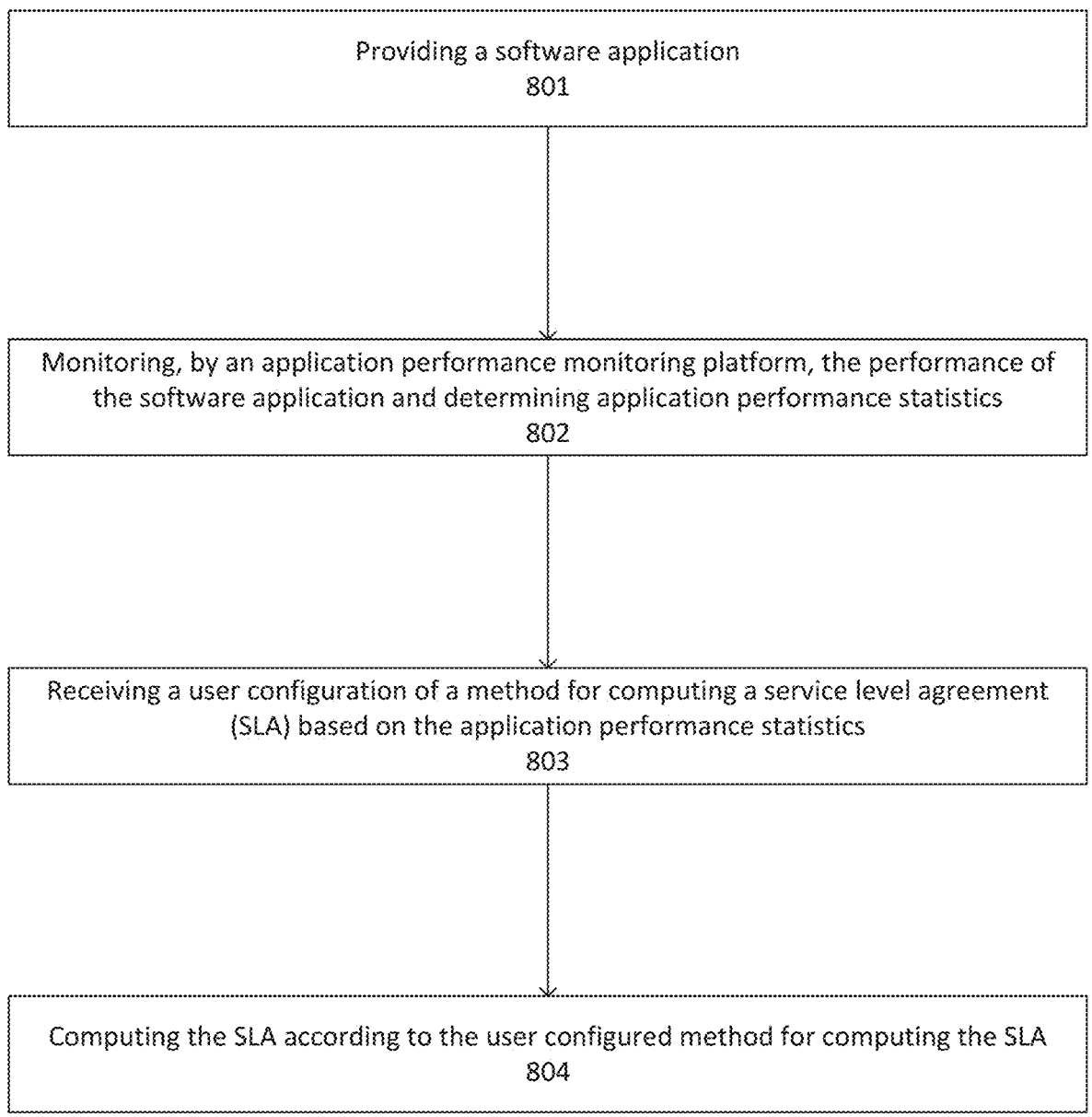
FIG. 8 illustrates an exemplary method for automatically computing a service level agreement.

FIG. 8 illustrates an exemplary method for automatically computing a service level agreement. In step 801, a software application is provided. In step 802, an application performance monitoring platform monitors the performance of the software application and determines application performance statistics. In step 803, a user configuration is received of a method for computing a service level agreement based on the application performance statistics. In step 804, the service level agreement is computed according to the user configured method for computing the service level agreement. After creation of the SLA, the application performance monitoring platform may monitor whether the SLA is met or not met by the software application. An alert may be displayed if the SLA is not met.

In some embodiments, pipeline templates are provided that can be stored as code defining continuous deployment pipelines. In the past, developers have had to create continuous deployment pipelines for every application they create. This is inefficient when many continuous deployment pipelines can be reused between applications or could at least be used as a template. The use of pipeline templates encoded as programmatic code means that the need to manually create continuous deployment pipelines can be reduced or eliminated. Instead, the pipeline template may be stored as code in a repository and deployed for new applications.

One exemplary embodiment, includes a non-transitory computer-readable medium storing computer code, such as computer-executable instructions, comprising a continuous deployment pipeline template. Moreover, a computer code repository may be provided on the computer-readable medium that stores the computer code comprising the continuous deployment pipeline template. The continuous deployment pipeline template may comprise a sequence of stages that define a continuous deployment pipeline. Individual stages may include, for example, deployment of infrastructure, disabling of infrastructure, resizing of infrastructure, determining the health of infrastructure, deploying a canary, disabling a canary, waiting, or other steps. Input may be received from a user to modify the computer code of the continuous deployment pipeline to add, modify, or remove stages of the continuous deployment pipeline. Input may be received from the user to check in or check out the computer code of the continuous deployment pipeline template from the repository.

In some embodiments, integrations may be provided between the continuous deployment platform and other tools used in software development. Developers currently use different tools at different stages of the software development cycle that are unintegrated. In some embodiments, integrations are used to integrate different stages of the software development cycle into a continuous deployment platform. Integration of these disparate pieces provides better analytics for the overall software development cycle and also reduces context switching for developers.

The software development cycle may include, for example, five stages: business story, writing code, testing, deployment, and troubleshooting. The business story stage of the development cycle relates to the brainstorming and ideation of new features and may be managed with issue tracking and project management software. The writing code stage relates to the development of the code for the feature by a developer and may be managed by repository software. The testing stage relates to testing developed code and may be managed by testing platform software. The deployment stage relates to deploying code to production and may be managed by deployment software. The troubleshooting stage relates to detecting and correcting bugs and issues and may be managed by bug tracking or issue tracking software. Integrating all of these software systems into the continuous deployment platform provides new insights and allows developers to more easily track information across stages. For example, integrations may be provided with application performance management software, repository software, search and analytics platforms for analyzing server logs, issue tracking and project management platforms, and others. Each integration may be instrumented to collect, store, and display analytics related to the use of each integrated tool.

Data visualizations may be provided through a user interface to provide analytics, metrics, and statistics about the software development cycle. A summary view may be provided to display a summary of the data about the software development life cycle collected from the integrations. User interface components may be presented to allow zooming in to view more specific data for a particular stage of the software development cycle. Each stage may be broken into more detailed sub-steps with their own additional, more specific statistics and data. User interface components may be presented to allow zooming in from each stage of the software development cycle to the more detailed sub-steps within the stage. Moreover, data may be viewed and filtered by application, product, or by team In one embodiment, a method is provided for providing analytics related to mean time to resolution. The method may including providing a software integration that identifies a first time when an issue is identified in a software application. The software integration may then identify a second time when the issue has been resolved. The continuous deployment platform may then calculate a mean time to resolution for issues in the software application.

In one embodiment, a method is provided for providing analytics related to lead time. The method may include providing a software integration that identifies a first time when a developer begins coding a new feature. The software integration may identify a second time when the new feature is released in a production release. The continuous deployment platform may then calculate a lead time measuring the time between when development was initiated on the new feature and when the new feature was released.

While analytics and visualizations help with understanding information about the software development cycle, it would also be advantageous to provide machine intelligence to recommend steps to take to improve the software development cycle, such as to reduce time to deployment and increase the number of successful deployments. A machine learning component may learn the most effective actions to perform at each stage of the software development cycle to reduce the amount of lead time from the coding of a feature to its deployment. Learning may be performed based on historical data from prior deployments in the same or different applications. The historical data may include data points about how long prior deployments took and whether they were successful or failed. The machine learning component may learn associations between actions taken in the software development life cycle and the time it took for deployments to occur and whether the deployments were successful or failed. The machine learning component may use supervised learning, unsupervised learning, deep learning, or other machine learning techniques. In one embodiment, the machine learning component is a recommendation system that uses the results of the machine learning to recommend one or more actions for a developer to perform at each stage of the software development cycle to most likely lead to a successful deployment and to reduce time to deployment in a production release.

Figure 9A:
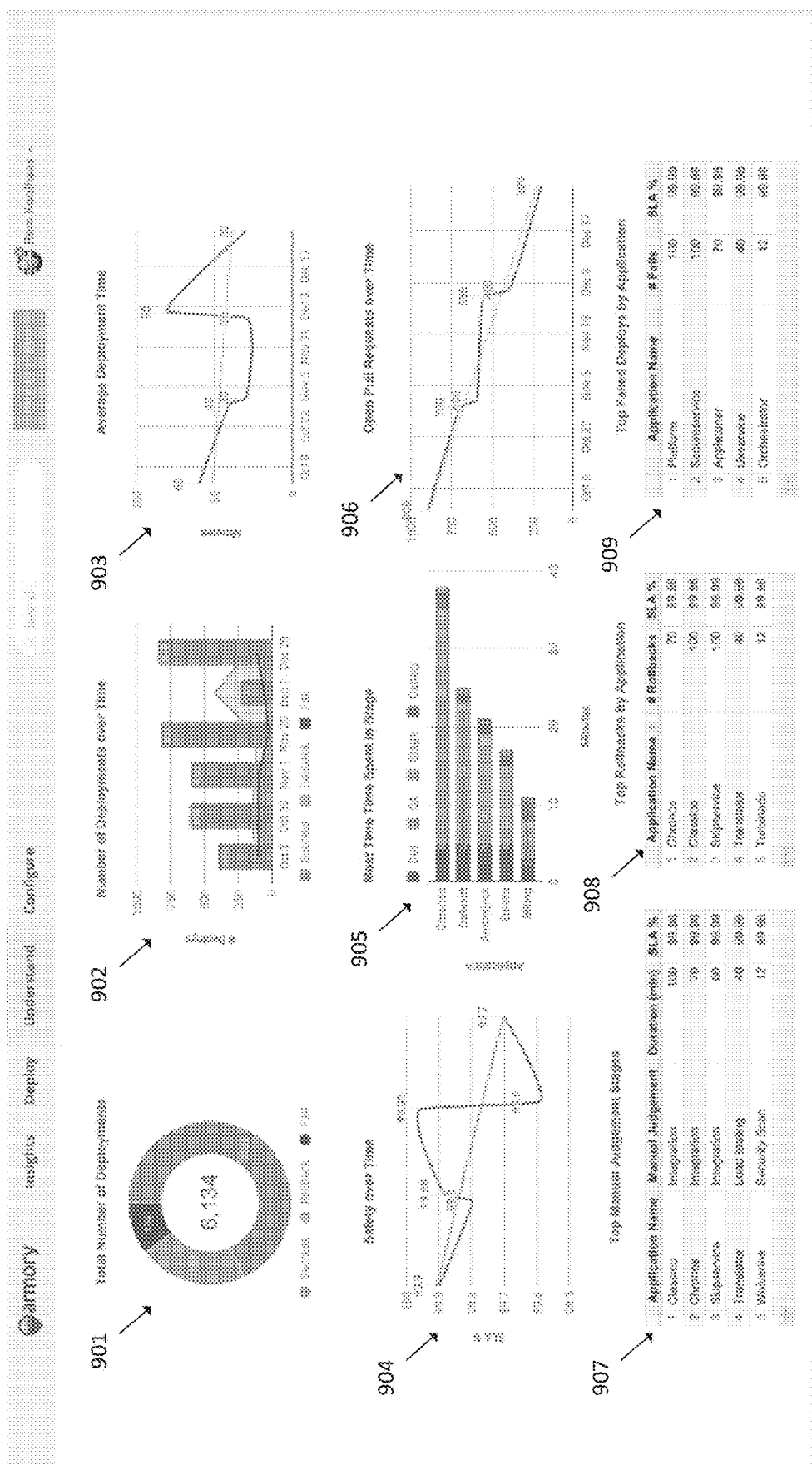
FIG. 9A shows an exemplary dashboard with statistics and metrics collected by a continuous deployment platform and its integrations.

FIG. 9A shows an exemplary dashboard 900 with statistics and metrics collected by the continuous deployment platform and its integrations to provide actionable insights regarding the software development lifecycle. The data in dashboard 900 may be used to identify high-performing and poor-performing applications in order to allow focusing resources on improving poor-performing applications. Moreover, the data may be used to diagnose and correct an application that is performing poorly. The data in dashboard 900 may be shown for a single application or may aggregate the data across multiple applications. Starting in the upper left and describing the charts in clockwise order, the first chart 901 shows the total number of deployments with a breakdown of those successful, rolled back, and failed. In some embodiments, a deployment may be marked as failed if the deployment fails prior to completion. Moreover, a rollback may be recorded if the deployment is completed, but the canary fails to achieve the necessary performance metrics and the deployment is rolled backed. The second chart 902 shows the number of deployments over time. Chart 902 illustrates the number of successful deployments, rolled back deployments, and failed deployments in a time series. The third chart 903 shows the average deployment time in minutes in a time series to allow comparison across different time periods. The chart 903 may chart multiple applications to allow comparison in deployment time for different applications. The fourth chart 906 shows the number of open pull requests over time. An increase in the number of open pull requests may indicate code changes that are not being deployed fast enough and adding value to the organization. In some embodiments, chart 906 may display the duration time of open pull requests instead of or in addition to the number of open pull requests, which may be indicative of continuous deployment velocity. The fifth chart 909 shows the top failed deployments per application. The chart 909 may display the number of failed deployments per application. Applications with more failed deployments may be problematic. The sixth chart 908 shows the top rollbacks by application. Chat 908 may display the number of rollbacks per application and more rollbacks may indicate a likelihood of poor performance of the application. The seventh chart 907 shows the top manual judgement stages per application. Chart 907 may display a list of applications and associated manual judgment steps in the deployment process for the application. Chart 907 may also display the average duration in minutes of the manual judgment step. Manual judgment steps with a longer duration may present an opportunity for improving the deployment process. The eighth chart 904 shows safety over time, displayed as the percentage compliance (measured in time) with SLAs over time. One or more applications may be displayed in chart 904 to allow comparison of their safety over time. In some embodiments, chart 904 may display the amount of uptime of one or more applications in addition to or alternatively to the percentage compliance with SLAs. The ninth chart 905 shows the amount of time spent in each stage, such as development, QA, staging, and canary, per application. Chart 905 may be displayed as a series of stacked charts. In some embodiments, the time in each stage may be displayed as a percentage of total time for the software lifecycle. A plurality of applications may be displayed in chart 905 to allow comparison. In an embodiment, the stages in chart 905 may be interacted with to show additional detail per stage, such as the amount of time spent per task in each stage. Chart 905 may be sorted in various ways such as displaying the applications in increasing or decreasing amounts of time or by compliance percentage with SLA. In some embodiments, additional data may be deep linked from charts 901-909, such as links to details of canary performance for deployments that succeeded, failed, or were rolled back. In some embodiments, charts 901-909 may show data in percentiles instead of or in addition to as averages.

In some embodiments, notifications may be generated to alert one or more users to changes in metrics regarding the software development life cycle. Notifications may be generated, for example, when an application has not been deployed within a threshold amount of time, such as the last 30 days, deployment velocity has slowed down by a threshold percentage, percentage compliance with SLAs decreases below a threshold, or the number of deployment failures and rollbacks has gone up or down.

In an embodiment, a policy engine is provided for the software development life cycle. The policy engine may track the identity of users pushing code. In an embodiment, the policy engine may require a manual approval of code before delivery when certain events are detected. For example, events may include a commit of code from a user that has not committed code within a threshold period of time, such as 6 months, or from a user that has introduced known errors or vulnerabilities into the application in the past.

In an embodiment, developer efficiency and productivity may be increased by using gamification. Gamification elements such as points may be introduced to encourage users to increase performance. Points may be awarded for positive outcomes such as increasing percentage compliance with SLAs, increasing deployment velocity, reducing the number of open pull requests or pull request duration, reducing the amount of time to deploy, increasing the number of deployments, and so on. In some embodiments, a leaderboard may be provided to display the highest scoring users. Digital or real-world rewards may be granted to users achieving high scores or certain milestones.

In an embodiment, the analytics data provided in dashboard 900 may be made accessible through an API to allow users to access the data and display it in other dashboard systems.

In an embodiment, the continuous deployment platform is used in an SDLC automation system that integrates and automates multiple services across the software development life cycle. One or more systems of record may be used in each stage of the SDLC. Stages may include change management, source control, continuous integration, continuous delivery, feature flagging, monitoring, logging, and alerting. Systems of record such as New Relic, JIRA, Github, Elastic Search, and others may be used in different stages. Each system of record may be integrated with the continuous deployment platform and automation applied to compress the SDLC. Actionable analytics may be collected from each of the systems of record and displayed in single dashboard 900.

Figure 9B:
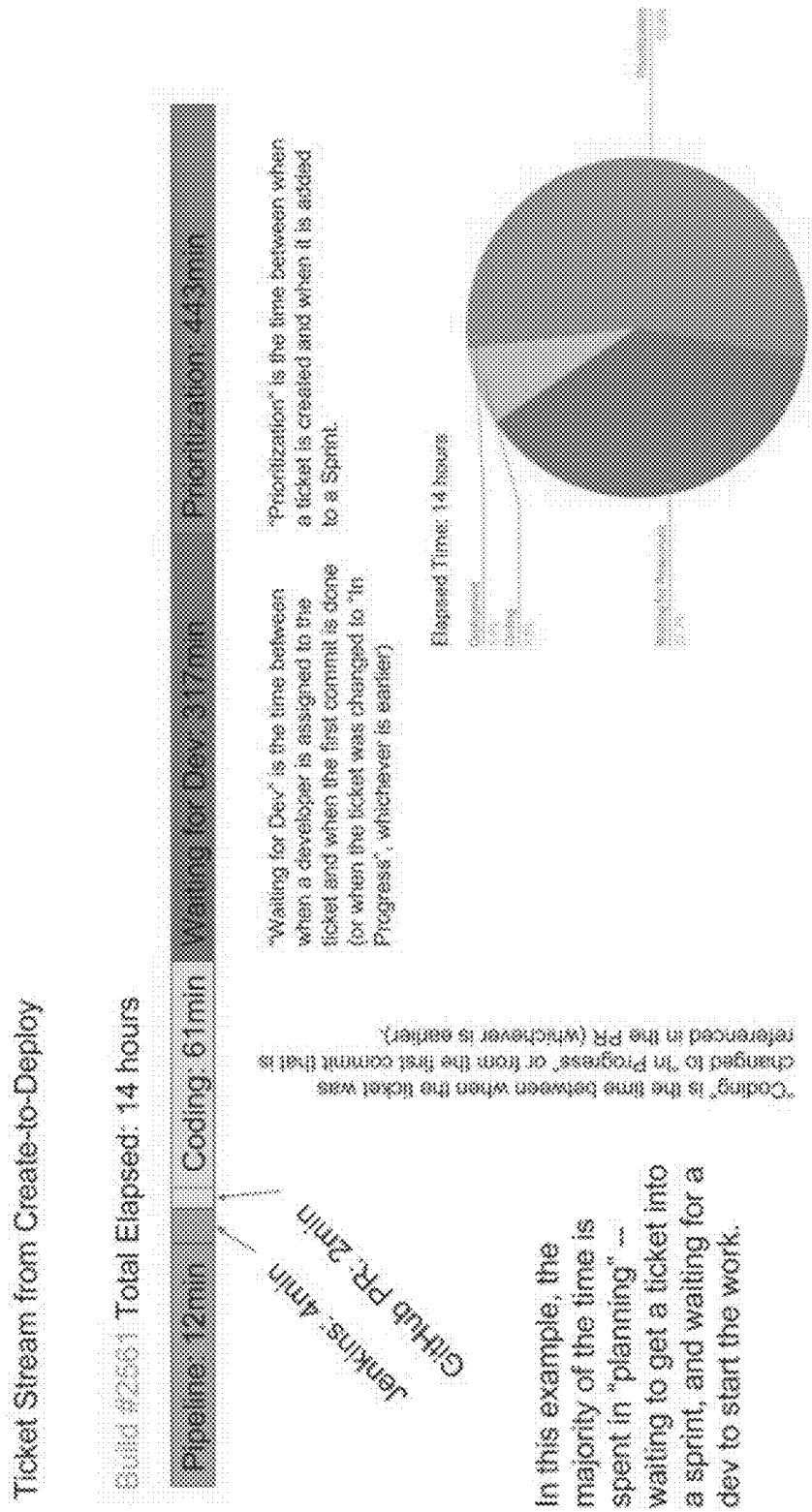
FIG. 9B illustrates exemplary time spent in different stages of the software development life cycle.

FIG. 9B illustrates an example of time spent in different stages of the SDLC as shown for the phases from creation to deployment of a ticket. In one embodiment, user interface elements may display metrics in a line chart and/or pie chart to illustrate these aspects to the user. In an embodiment, a pipeline stage comprises the time spent in planning, a coding stage comprises the time spent by a programmer coding to resolve a ticket, waiting for developer comprises time waiting for the developer to begin work on the ticket, and prioritization comprises time spent waiting after a ticket's creation for it to be added to a development sprint.

Figure 9C:
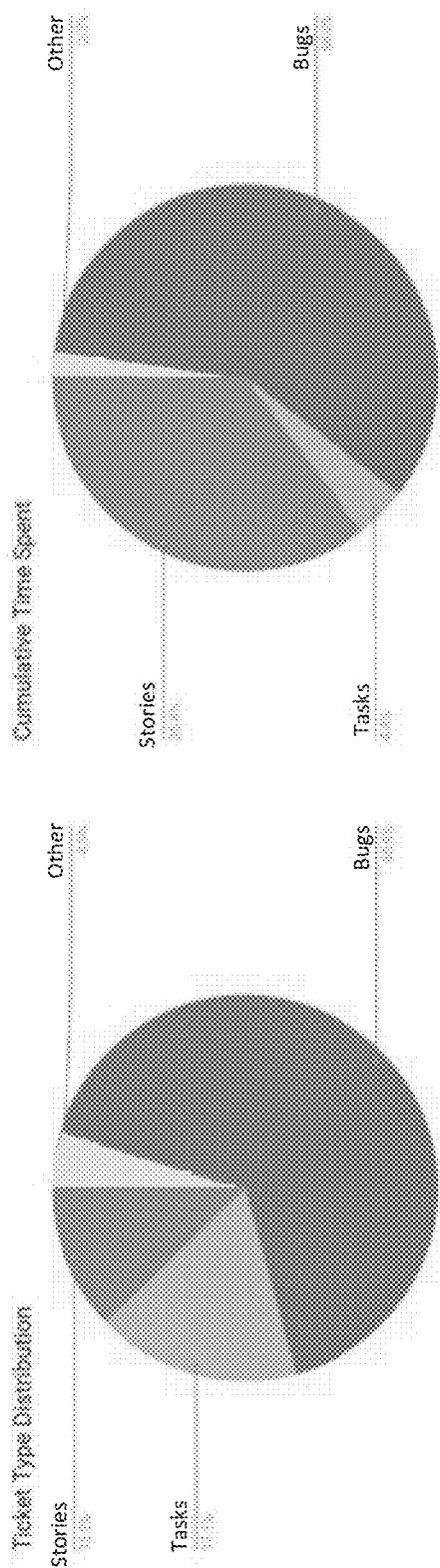
FIG. 9C illustrates exemplary time spent on different types of tickets in the software development life cycle.

FIG. 9C illustrates the distribution of types of tickets in an exemplary embodiment of an SDLC. Tickets may comprise, for example, bugs, stories, tasks, or other tickets. User interface elements may display to the user the distribution of ticket types, by number, and the distribution of time spent resolving each of the ticket types.

In some embodiments, an intelligent chatbot is provided as an interface through which users may perform the methods and use the systems described herein. The intelligent chatbot may exist in a chat environment with a plurality of users, where users may message each other through direct messages or through chat rooms. The intelligent chatbot may simulate the appearance and activity of a human user in the chat environment. The intelligent chat may have a user name or handle through which it may be contacted. In one embodiment, the chat bot provides an interface through which any of the features of the continuous deployment platform may be accessed. The chat bot may both present information, such as alerts, and also perform actions in response to a user request. In one embodiment, the chat bot interactively responds to requests to perform an automated canary deployment, and, in response, the chat bot triggers the creation of an automated canary deployment in response to the user request. In one embodiment, the chat bot interactively responds to requests to create an application, and, in response, the chat bot triggers creation of an application in response to the request. In one embodiment, the chat bot interactively responds to requests to create a service level agreement, and, in response, the chat bot triggers creation of a service level agreement for an application.

Figure 10:
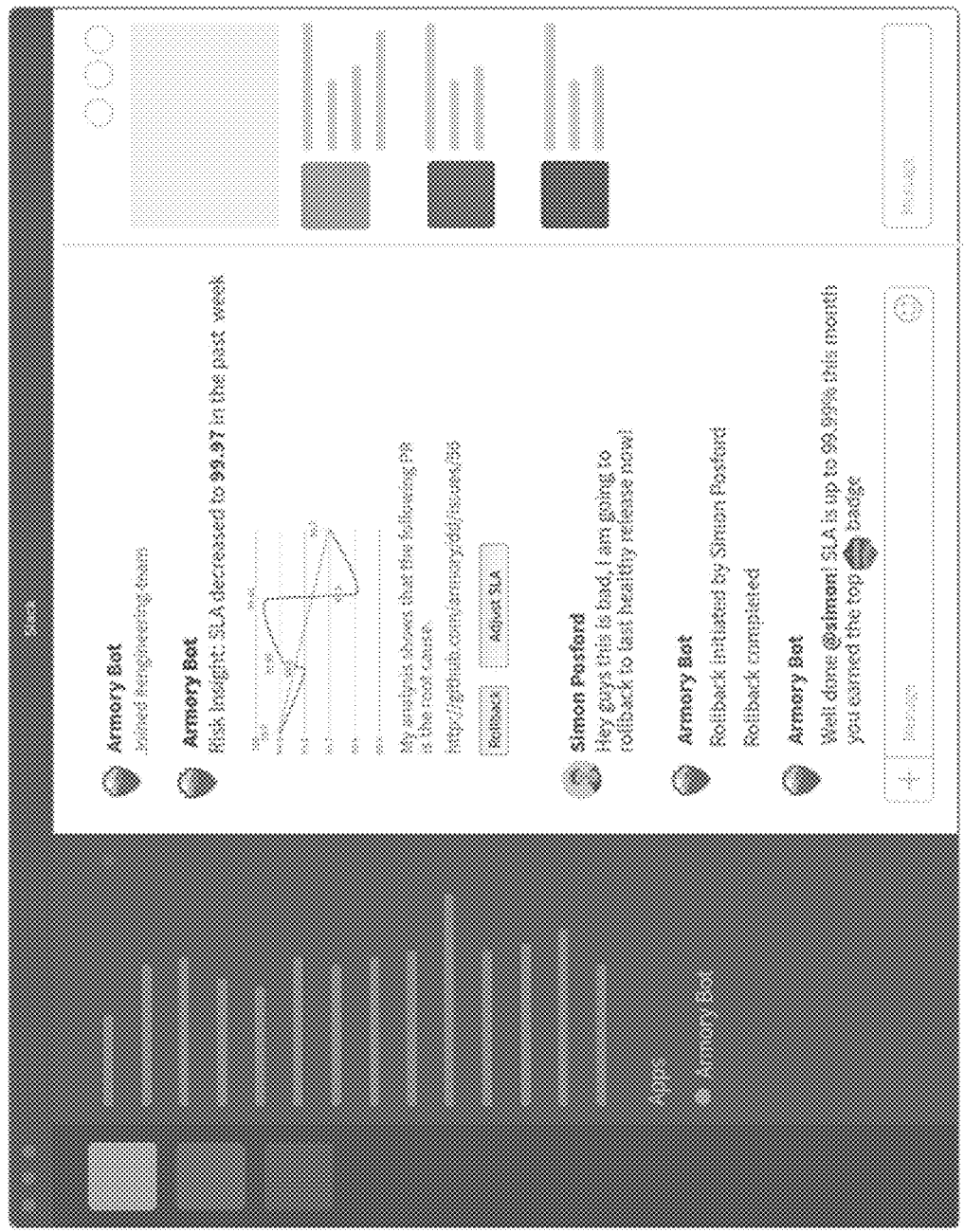
FIG. 10 shows a first exemplary interface with an intelligent chat bot capable of performing some methods herein.

FIG. 10 shows an exemplary interface showing the intelligent chatbot. In this example, the intelligent chatbot has joined a chatroom. The intelligent chatbot creates and sends a message indicating that the compliance with SLA has decreased and therefore presents a risk. It also shows the latest pull request that caused the SLA to decrease. The chatbot presents two buttons with the options to roll back the change (pull request) that caused the SLA to decrease or to adjust the SLA so that the performance is within the SLA. In response to a request from the user to roll back the change, the deployment with the latest pull request may be disabled and its traffic redirected to a control version of the deployment that does not have the problematic code.

Figure 11:
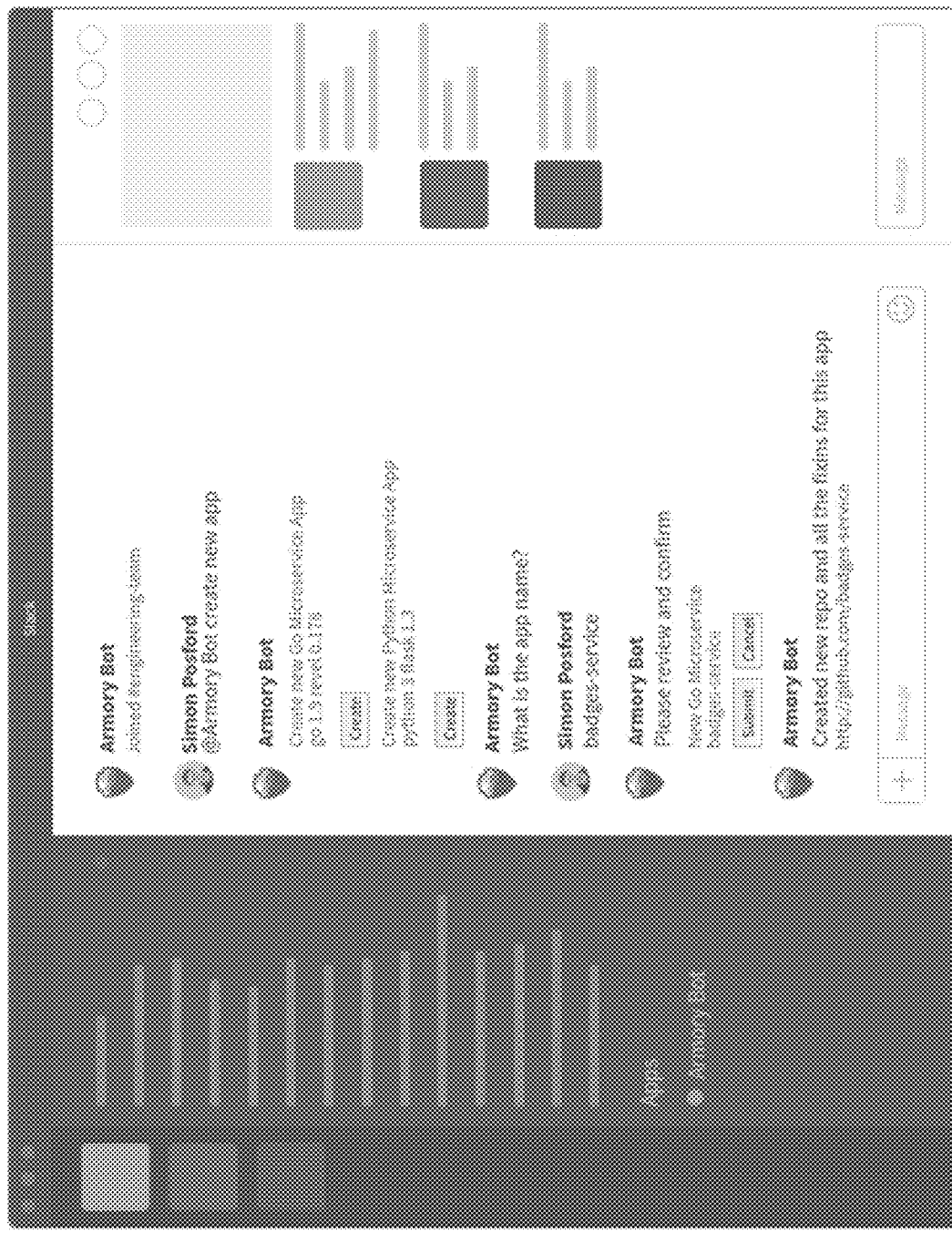
FIG. 11 shows a second exemplary interface with an intelligent chat bot capable of performing some methods herein.

FIG. 11 shows an additional exemplary interface showing the intelligent chat bot. The intelligent chat bot enables creation of a new application. A human user addresses the chat bot by user name and requests creation of an application. The chat bot responds by providing user interface elements for creating a new application.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A computer-implemented method for automated canary deployment, the method comprising:
    providing a first production hardware infrastructure running a first production code;
    receiving a code update in a development environment;
    launching a second production hardware infrastructure running a second production code that incorporates the code update;
    directing a first portion of user traffic to the first production hardware infrastructure and a second portion of user traffic to the second production hardware infrastructure;
    monitoring the performance of the first production code and the second production code in serving user traffic;
    determining whether the performance of the second production code falls below a threshold performance on one or more metrics;
    when the second production code does not fall below the threshold performance on the one or more metrics for a period of time, redirecting the first portion of user traffic from the first production hardware infrastructure to the second production hardware infrastructure.

2. The method of claim 1, further comprising:
    when the second production code does not fall below the threshold performance on the one or more metrics for a period of time, disabling the first production hardware infrastructure.

3. The method of claim 1, further comprising:
    when the second production code falls below the threshold performance on the one or more metrics, redirecting the second portion of user traffic to the first production hardware infrastructure and disabling the second production hardware infrastructure.

4. The method of claim 1, further comprising:
    monitoring the second production code for adverse events;
    when a threshold number of adverse events is exceeded, redirecting the second portion of user traffic to the first production hardware infrastructure and disabling the second production hardware infrastructure.

5. The method of claim 1, wherein the performance monitoring of the first production code and the second production code includes monitoring of one or more of the uptime, response time, latency and error rate.

6. The method of claim 1, further comprising:
    providing a chat bot that interactively responds to requests to perform an automated canary deployment;
    the chat bot triggering an automated canary deployment in response to a user request.

7. The method of claim 1, further comprising:
    performing the automated canary deployment in response to activation of a one-click application creation process.

8. The method of claim 1, further comprising:
    automatically computing a service level agreement for the second production code based on the monitoring the performance of the second production code in serving user traffic.

9. The method of claim 1, further comprising:
    generating performance metrics based on monitoring the performance of the first production code and the second production code in serving user traffic;
    displaying the performance metrics in a dashboard.

10. The method of claim 9, wherein the performance metrics include the percentage compliance with a service level agreement over time.

11. The method of claim 9, wherein the performance metrics include the number of deployments over time.

12. The method of claim 9, wherein the performance metrics include the average duration of open pull requests over time.

13. The method of claim 9, wherein the performance metrics include a measure of the amount of time spent in a plurality of stages of the software development life cycle.

* * * * *